(12) United States Patent
Ehnes et al.

(10) Patent No.: US 7,398,715 B2
(45) Date of Patent: Jul. 15, 2008

(54) METHOD FOR USING A CUTTING TOOL HAVING VARIABLE ROTATION ABOUT A Y-DIRECTION TRANSVERSELY ACROSS A WORK PIECE FOR MAKING MICROSTRUCTURES

(75) Inventors: Dale L. Ehnes, Cotati, CA (US); Alan B. Campbell, Santa Rosa, CA (US); Daniel S. Wertz, Sebastopol, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/865,292

(22) Filed: Oct. 1, 2007

(65) Prior Publication Data
US 2008/0016992 A1  Jan. 24, 2008

Related U.S. Application Data

(63) Continuation of application No. 11/273,884, filed on Nov. 15, 2005, now Pat. No. 7,290,471.

(51) Int. Cl.
  *B23B 1/00* (2006.01)
  *B23B 3/00* (2006.01)

(52) U.S. Cl. .................. 82/1.11; 82/123; 82/70.1

(58) Field of Classification Search .......... 82/1.11, 82/70.1, 118, 123, 157; 83/368, 768, 881; 29/561, 563
See application file for complete search history.

(56) References Cited

U.S. PATENT DOCUMENTS

| | | | |
|---|---|---|---|
| 5,063,322 A * | 11/1991 | Sugita et al. | 310/341 |
| 5,291,812 A | 3/1994 | Yen et al. | |
| 5,467,675 A | 11/1995 | Dow et al. | |
| 6,040,653 A | 3/2000 | O'Neill | |
| 6,170,367 B1 * | 1/2001 | Keller et al. | 82/1.11 |
| 6,237,452 B1 | 5/2001 | Ludwick et al. | |
| 6,322,236 B1 | 11/2001 | Campbell et al. | |
| 6,354,709 B1 | 3/2002 | Campbell et al. | |
| 6,356,391 B1 | 3/2002 | Gardiner et al. | |

(Continued)

FOREIGN PATENT DOCUMENTS

JP  63-306854  12/1988

(Continued)

OTHER PUBLICATIONS

UltraMill Research@PEC.NCSU, "Vibration Assisted Machining: Ultramill," North Carolina State University Precision Engineering Center, Raleigh, NC 27695, [http://airy.pec.ncsu.edu/PEC/research/projects/ultramill/index.html], Spring 2000, p. 2.

(Continued)

*Primary Examiner*—Willmon Fridie
(74) *Attorney, Agent, or Firm*—Lance Vietzke

(57) ABSTRACT

A cutting tool assembly having a tool post capable of lateral movement along a work piece to be cut and an actuator with a tool tip. The actuator provides for variable control of a rotation of the tool tip about an axis parallel to a y-direction transversely across the work piece for use in making microstructures in the work piece.

11 Claims, 7 Drawing Sheets

U.S. PATENT DOCUMENTS

| | | | |
|---|---|---|---|
| 6,560,026 | B2 | 5/2003 | Gardiner et al. |
| 6,581,286 | B2 | 6/2003 | Campbell et al. |
| 6,597,968 | B2 | 7/2003 | Matsumoto et al. |
| 6,707,611 | B2 | 3/2004 | Gardiner et al. |
| 6,811,274 | B2 | 11/2004 | Olczak |
| 6,814,113 | B1 * | 11/2004 | Daniels .................. 144/351 |
| 6,844,950 | B2 | 1/2005 | Ja Chisholm et al. |
| 6,845,212 | B2 | 1/2005 | Gardiner et al. |
| 6,862,141 | B2 | 3/2005 | Olczak |
| 6,909,482 | B2 | 6/2005 | Olczak |
| 6,925,915 | B1 | 8/2005 | Claesson et al. |
| 6,945,099 | B1 * | 9/2005 | Su et al. .................. 73/105 |
| 6,951,400 | B2 | 10/2005 | Chisholm et al. |
| 6,952,627 | B2 | 10/2005 | Olczak et al. |
| 7,089,836 | B2 * | 8/2006 | Kato et al. .................. 82/1.11 |
| 7,101,694 | B2 * | 9/2006 | Hirokawa et al. ........... 435/189 |
| 2003/0035231 | A1 | 2/2003 | Epstein et al. |
| 2003/0108710 | A1 | 6/2003 | Coyle et al. |
| 2003/0112521 | A1 | 6/2003 | Gardiner et al. |
| 2004/0035266 | A1 | 2/2004 | Montesanti et al. |
| 2004/0045419 | A1 | 3/2004 | Bryan et al. |
| 2004/0109663 | A1 | 6/2004 | Olczak |
| 2005/0223858 | A1 | 10/2005 | Lu et al. |

FOREIGN PATENT DOCUMENTS

| | | |
|---|---|---|
| JP | 01-281848 | 11/1989 |
| JP | 9-275689 | 10/1997 |
| JP | 10-118811 | 5/1998 |
| JP | 2004098230 A | 4/2004 |
| JP | 2005-014169 | 1/2005 |
| KR | 2004096676 A | 9/2005 |
| WO | 97/48521 | 12/1997 |
| WO | 00/25963 | 5/2000 |
| WO | 00/50201 | 8/2000 |
| WO | 02/06005 A1 | 1/2002 |
| WO | 02/37168 A2 | 5/2002 |
| WO | 02/037168 A3 | 5/2002 |
| WO | 03/086688 A1 | 10/2003 |
| WO | 2005/043266 A2 | 5/2005 |
| WO | 2005/043266 A3 | 5/2005 |

OTHER PUBLICATIONS

Edward M. Trent & Paul K. Wright, *Metal Cutting*, 4th ed., Butterworth, Heinemann, 2000, pp. 258-260.

Zhang Jin-Hua, *Theory and Technique of Precision Cutting*, Pergamon Press, 1991, Chap. 2, "Nature of Cutting Force Variation in Precision Cutting," pp. 18-31.

M. K. Krueger, S. C. Yoon, D. Gong, S. B. McSpadden Jr., L. J. O'Rourke, R. J. Parten, "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, p. 15.

\* cited by examiner

METHOD FOR USING A CUTTING TOOL HAVING VARIABLE ROTATION ABOUT A Y-DIRECTION TRANSVERSELY ACROSS A WORK PIECE FOR MAKING MICROSTRUCTURES

REFERENCE TO RELATED APPLICATIONS

The present application is a continuation of U.S. application Ser. No. 11/273,884, filed Nov. 15, 2005, now U.S. Pat. No. 7,290,471, which is incorporated herein by reference.

FIELD OF INVENTION

The present invention relates to diamond machining of microreplication tools used in creating microreplicated structures.

BACKGROUND

Machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructures can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Another alternate method to make a light directing film is to directly cut or machine a transparent material to form the appropriate structures.

Other techniques include chemical etching, bead blasting, or other stochastic surface modification techniques. However, those techniques are typically not capable of forming the sharp, precise microstructures, and the breadth of features, desired to obtain the appropriate light diffusion characteristic achieved with a cutting tool using the methods of the present invention. In particular, these methods are not capable of producing highly accurate, repeating structures because of the inherent impreciseness and unrepeatability associated with chemical etching, bead blasting, and other stochastic surface modification techniques.

SUMMARY OF INVENTION

A first cutting tool assembly includes a tool post and an actuator configured for attachment to the tool post and for electrical communication with a controller. A tool tip attached to the actuator is mounted for movement with respect to a work piece to be cut. The actuator provides for variable control of a rotation of the tool tip in a plane parallel to a y-direction transversely across the work piece for use in selectively cutting the work piece.

A second cutting tool assembly includes a tool post capable of lateral movement along a work piece to be cut and an actuator configured for attachment to the tool post and for electrical communication with a controller, the actuator including a piezoelectric stack. A tool tip attached to the piezoelectric stack is mounted for movement with respect to the work piece to be cut. The actuator provides for variable control of a rotation of the tool tip in a plane parallel to a y-direction transversely across the work piece for use in selectively cutting the work piece in order to make microstructures in the work piece.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Cutting Tool System

General diamond turning techniques are described in PCT Published Application WO 00/48037, incorporated herein by reference as if fully set forth. The apparatus used in methods and for making optical films or other films can include a fast servo tool. As disclosed in WO 00/48037, a fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 1:
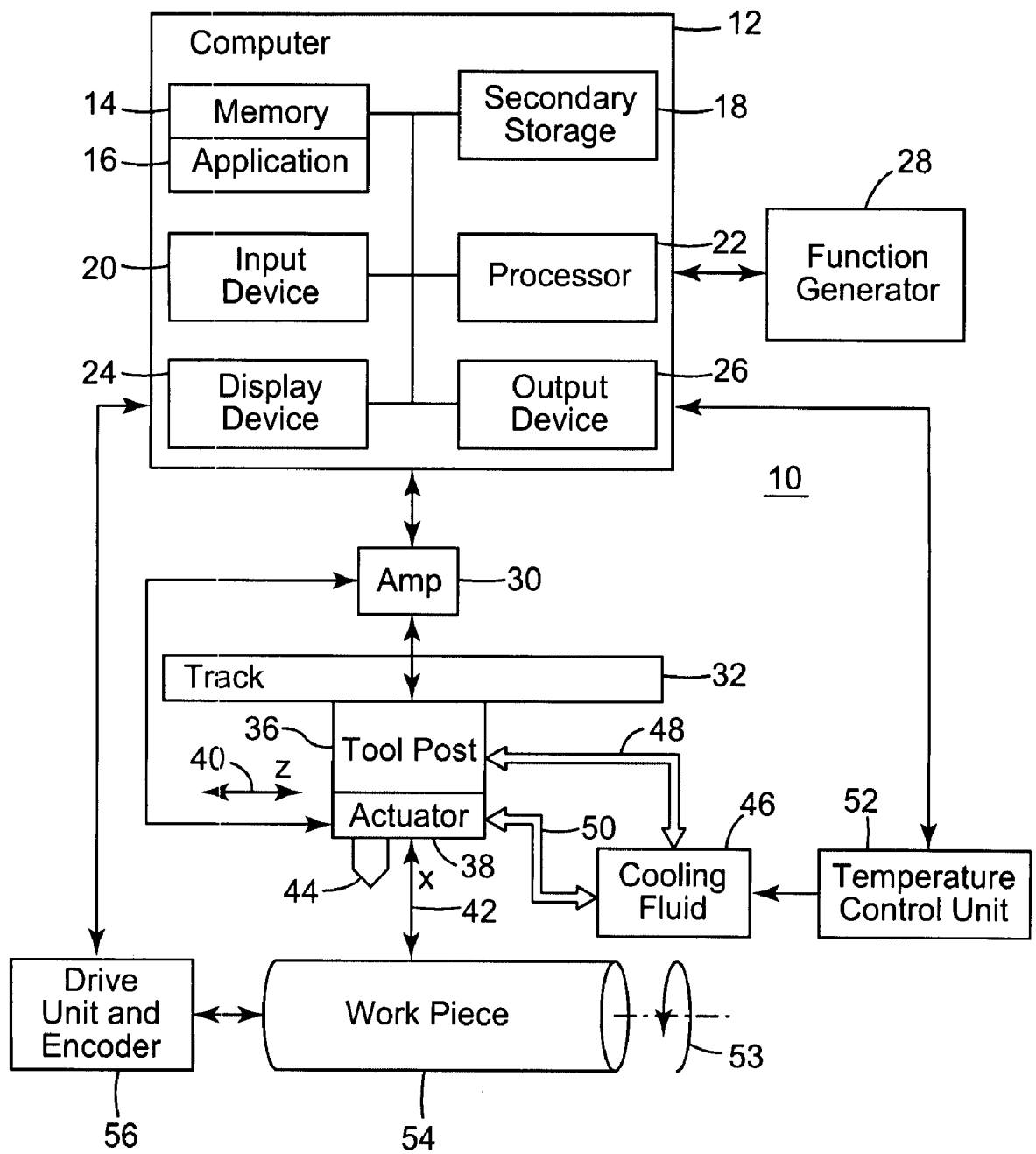
FIG. 1 is a diagram of a cutting tool system for making microstructures in a work piece.

FIG. 1 is a diagram of a cutting tool system 10 for making microstructures in a work piece. Microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). These dimensions are provided for illustrative purposes only, and microstructures made using the actuators and system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 16 or secondary storage 18, or received from another source; a display device 24 for outputting a visual display of information; and an output device 26 for outputting information in other forms such as speakers for audio information or a printer for a hardcopy of information.

The cutting of a work piece 54 is performed by a tool tip 44. An actuator 38 controls movement of tool tip 44 as work piece 54 is rotated by a drive unit and encoder 56, such as an electric motor controlled by computer 12. In this example, work piece 54 is shown in roll form such as a hard copper roll; however, it can be implemented in planar form and make use of other materials for machining. For example, the work piece can be alternatively implemented with aluminum, nickel, steel, or plastics (e.g., acrylics). The particular material to be used may depend, for example, upon a particular desired application such as various films made using the machined work piece. Actuator 38, and the actuators described below, can be implemented with stainless steel, for example, or other materials.

Actuator 38 is removably connected to a tool post 36, which is in turn located on a track 32. The tool post 36 and actuator 38 are configured on track 32 to move in both an x-direction and a z-direction as shown by arrows 40 and 42. Computer 12 is in electrical connection with tool post 36 and actuator 38 via one or more amplifiers 30. When functioning as a controller, computer 12 controls movement of tool post 36 along track 32 and movement of tool tip 44 via actuator 38 for machining work piece 54. If an actuator has multiple PZT stacks, it can use separate amplifiers to independently control each PZT stack for use in independently controlling movement of a tool tip attached to the stacks. Computer 12 can make use of a function generator 28 in order to provide waveforms to actuator 38 in order to machine various microstructures in work piece 54, as further explained below.

The machining of work piece 54 is accomplished by coordinated movements of various components. In particular, the system, under control of computer 12, can coordinate and control movement of actuator 38, via movement of tool post 36, along with movement of the work piece in the c-direction and movement of tool tip 44 in one or more of the x-direction, y-direction, and z-direction, those coordinates being explained below. The system typically moves tool post 36 at a constant speed in the z-direction, although a varying speed may be used. The movements of tool post 36 and tool tip 44 are typically synchronized with the movement of work piece 54 in the c-direction (rotational movement as represented by line 53). All of these movement can be controlled using, for example, numerical control techniques or a numerical controller (NC) implemented in software, firmware, or a combination in computer 12.

Work piece 54, after having been machined, can be used to make films having the corresponding microstructures for use in a variety of applications. Examples of those films include optical films, friction control films, and micro-fasteners or other mechanical microstructured components. The films are typically made using a coating process in which a material in a viscous state is applied to the work piece, allowed to at least partially cure, and then removed. The film composed of the cured material will have substantially the opposite structures than those in the work piece. For example, an indentation in the work piece results in a protrusion in the resulting film.

Cooling fluid 46 is used to control the temperature of tool post 36 and actuator 38 via lines 48 and 50. A temperature control unit 52 can maintain a substantially constant temperature of the cooling fluid as it is circulated through tool post 36 and actuator 38. Temperature control unit 52 can be implemented with any device for providing temperature control of a fluid. The cooling fluid can be implemented with an oil product, for example a low viscosity oil. The temperature control unit 52 and reservoir for cooling fluid 46 can include pumps to circulate the fluid through tool post 36 and actuator 38, and they also typically include a refrigeration system to remove heat from the fluid in order to maintain it at a substantially constant temperature. Refrigeration and pump systems to circulate and provide temperature control of a fluid are known in the art. In certain embodiments, the cooling fluid can also be applied to work piece 54 in order to maintain a substantially constant surface temperature of the material to be machined in the work piece.

Figure 2:
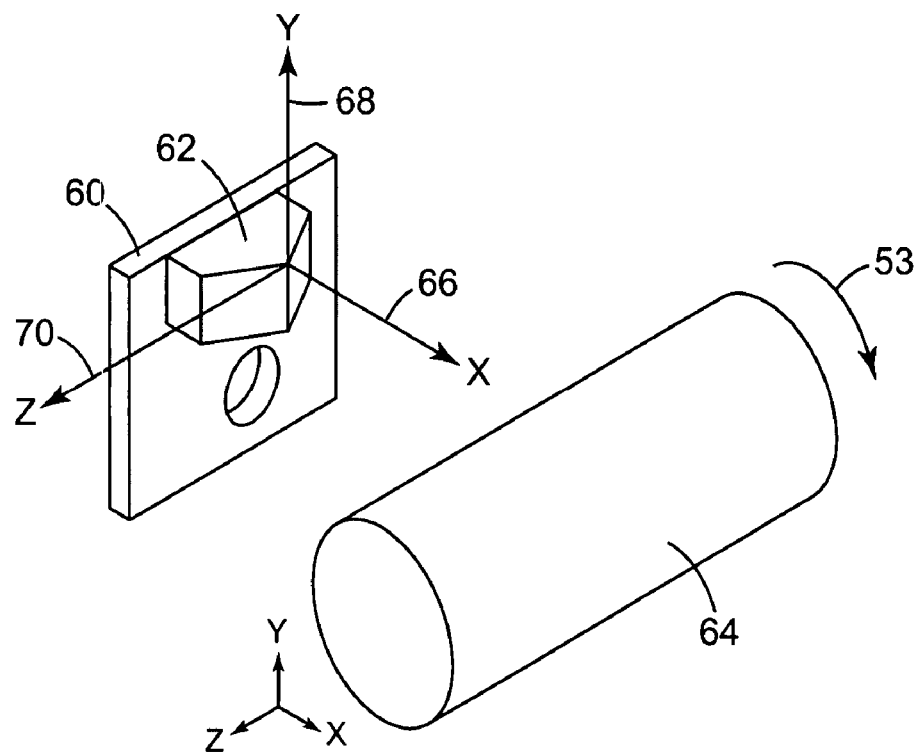
FIG. 2 is a diagram illustrating a coordinate system for a cutting tool.

FIG. 2 is a diagram illustrating a coordinate system for a cutting tool such as system 10. The coordinate system is shown as movement of a tool tip 62 with respect to a work piece 64. Tool tip 62 may correspond with tool tip 44 and is typically attached to a carrier 60, which is attached to an actuator. The coordinate system, in this exemplary embodiment, includes an x-direction 66, a y-direction 68, and a z-direction 70. The x-direction 66 refers to movement in a direction substantially perpendicular to work piece 64. The y-direction 68 refers to movement in a direction transversely across work piece 64 such as in a direction substantially parallel to a plane of rotation of work piece 64. The z-direction 70 refers to movement in a direction laterally along work piece 64 such as in a direction substantially perpendicular to a plane of rotation of work piece 64. The rotation of the work piece is referred to as the c-direction, as also shown in FIG. 1. If the work piece is implemented in planar form, as opposed to roll form, then the y-direction and z-direction refer to movement in mutually orthogonal directions across the work piece in directions substantially perpendicular to the x-direction.

The system 10 can be used for high precision, high speed machining. This type of machining must account for a variety of parameters, such as the coordinated speeds of the components and the work piece material. It typically must take into consideration the specific energy for a given volume of metal to be machined, for example, along with the thermal stability and properties of the work piece material. Cutting parameters relating to machining are described in the following references, all of which are incorporated herein by reference as if fully set forth: Machining Data Handbook, Library of Congress Catalog Card No. 66-60051, Second Edition (1972); Edward Trent and Paul Wright, Metal Cutting, Fourth Edition, Butterworth-Heinemann, ISBN 0-7506-7069-X (2000); Zhang Jin-Hua, Theory and Technique of Precision Cutting, Pergamon Press, ISBN 0-08-035891-8 (1991); and M. K. Krueger et al., New Technology in Metalworking Fluids and Grinding Wheels Achieves Tenfold Improvement in Grinding Performance, Coolant/Lubricants for Metal Cutting and Grinding Conference, Chicago, Ill., U.S.A., Jun. 7, 2000.

PZT Stack, Tool Tip Carrier, and Tool Tip

Figure 3:
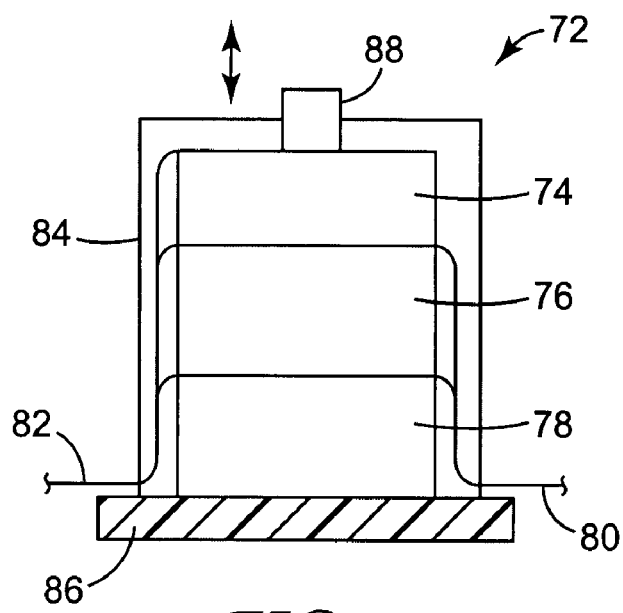
FIG. 3 is a diagram of an exemplary PZT stack for use in a cutting tool.

FIG. 3 is a diagram of an exemplary PZT stack 72 for use in a cutting tool. A PZT stack is used to provide movement of a tool tip connected to it and operates according to the PZT effect, which is known in the art. According to the PZT effect, an electric field applied to certain types of materials causes expansion of them along one axis and contraction along another axis. A PZT stack typically includes a plurality of materials 74, 76, and 78 enclosed within a casing 84 and mounted on a base plate 86. The materials in this exemplary embodiment are implemented with a ceramic material subject to the PZT effect. Three disks 74, 76, and 78 are shown for exemplary purposes only and any number of disks or other materials, and any type of shapes of them, can be used based upon, for example, requirements of particular embodiments. A post 88 is adhered to the disks and protrudes from casing 84. The disks can be implemented with any PZT material such as for example, a barium titanate, lead zirconate, or lead titanate material mixed, pressed, based, and sintered. One such PZT material is available from Kinetic Ceramics, Inc., 26240 Industrial Blvd., Hayward, Calif. 94545, U.S.A. The disks can also be implemented with a magnetostrictive material, for example.

Electrical connections to the disks 74, 76, and 78, as represented by lines 80 and 82, provide electrical fields to them in order to provide for movement of post 88. Due to the PZT effect and based upon the type of electric field applied, precise and small movement of post 88, such as movement within several microns, can be accomplished. Also, the end of PZT stack 72 having post 88 can be mounted against one or more Belleville washers, which provides for preloading of the PZT stack. The Belleville washers have some flexibility to permit movement of post 88 and a tool tip attached to it. Each PZT stack in the actuators described below can also incorporate Belleville washers for preloading or, alternatively, any device mounted against each PZT stack for preloading of it.

Figure 4A:
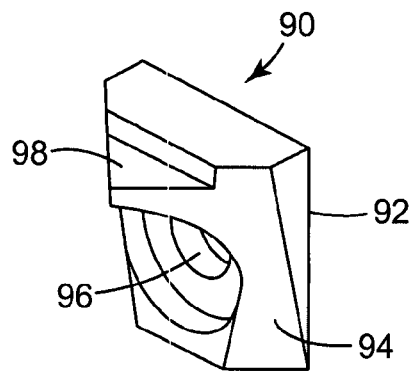
FIG. 4A is a perspective view of a tool tip carrier.
Figure 4B:
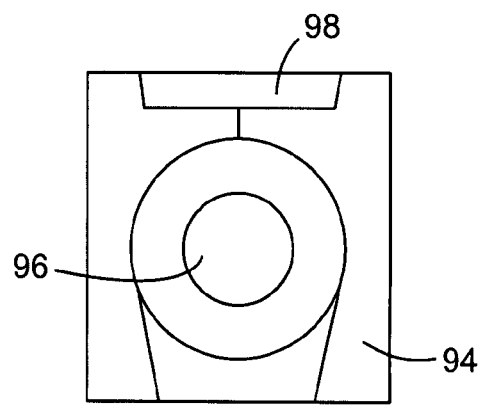
FIG. 4B is a front view of a tool tip carrier for holding a tool tip.
Figure 4C:
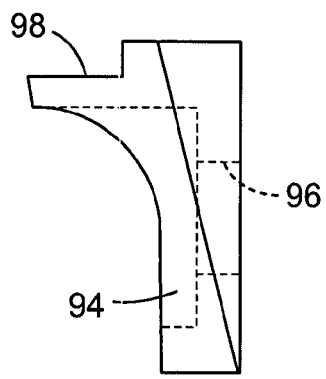
FIG. 4C is a side view of a tool tip carrier.
Figure 4D:
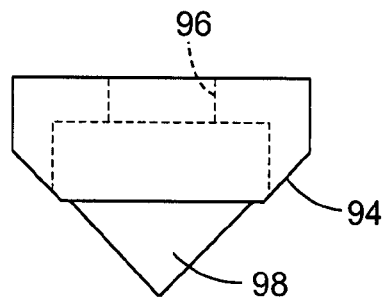
FIG. 4D is a top view of a tool tip carrier.

FIGS. 4A-4D are views of an exemplary tool tip carrier 90, which would be mounted to post 88 of the PZT stack for control by an actuator, as explained below. FIG. 4A is a perspective view of tool tip carrier 90. FIG. 4B is a front view of tool tip carrier 90. FIG. 4C is a side view of tool tip carrier 90. FIG. 4D is a top view of tool tip carrier 90.

As shown in FIGS. 4A-4D, tool tip carrier 90 includes a planar back surface 92, a tapered front surface 94, and a protruding surface 98 with angled or tapered sides. An aperture 96 provides for mounting of tool tip carrier 90 onto a post of a PZT stack. Tapered surface 98 would be used for mounting of a tool tip for machining of a work piece. In this exemplary embodiment, tool tip carrier 90 includes a planar surface to enhance stability of mounting it by providing for more surface area contact when mounted to a PZT stack, and it includes the tapered front surfaces to reduce the mass of it. Tool tip carrier 90 would be mounted to post 88 of the PZT stack by use of an adhesive, brazing, soldering, a fastener such as a bolt, or in other ways.

Other configurations of tool tip carriers are possible based, for example, upon requirements of particular embodiment. The term "tool tip carrier" is intended to include any type of structure for use in holding a tool tip for machining a work piece. Tool tip carrier 90 can be implemented with, for example, one or more of the following materials: sintered carbide, silicon nitride, silicon carbide, steel, or titanium. The material for tool tip carrier 90 preferably is stiff and has a low mass.

Figure 5A:
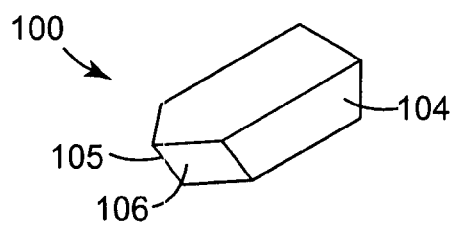
FIG. 5A is a perspective view of a tool tip.
Figure 5B:
FIG. 5B is a front view of a tool tip.
Figure 5C:
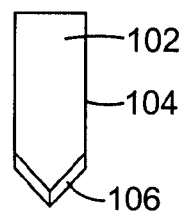
FIG. 5C is a bottom view of a tool tip.
Figure 5D:
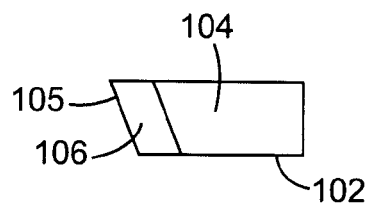
FIG. 5D is a side view of a tool tip.

FIGS. 5A-5D are views of an exemplary tool tip 100, which would be secured to surface 98 of tool tip carrier 90 such as by use of an adhesive, brazing, soldering, or in other ways. FIG. 5A is a perspective view of tool tip 100. FIG. 5B is a front view of tool tip 100. FIG. 5C is a bottom view of tool tip 100. FIG. 5D is a side view of tool tip 100. As shown in FIGS. 5A-5D, tool tip 100 includes sides 104, tapered and angled front surfaces 106, and a bottom surface 102 for securing it to surface 98 of tool tip carrier 90. The front portion 105 of tool tip 100 is used for machining of a work piece under control of an actuator. Tool tip 90 can be implemented with, for example, a diamond slab.

Virtual Center Y Actuator

Figure 6A:
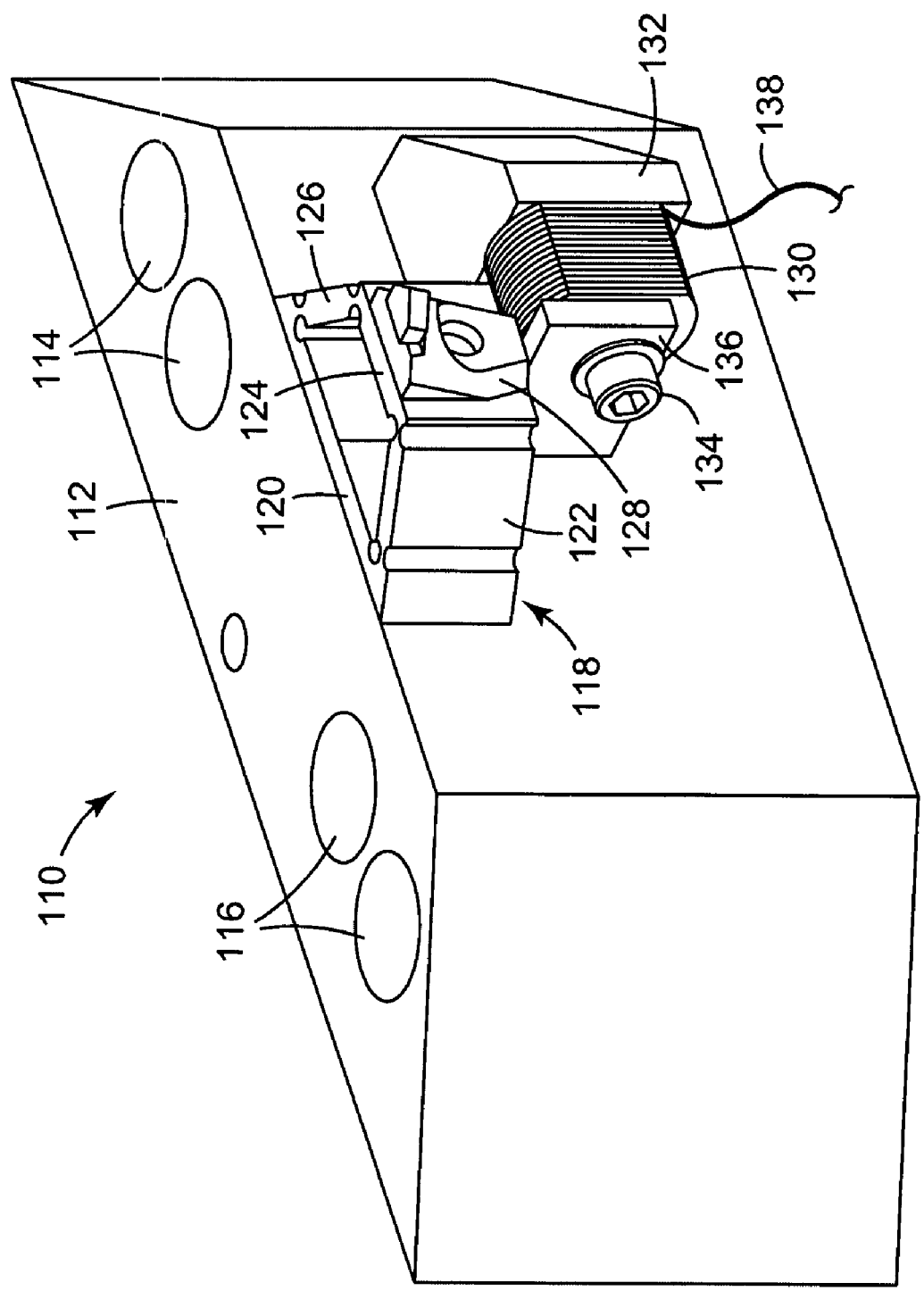
FIG. 6A is a perspective view of a virtual center Y actuator for use with a cutting tool.
Figure 6B:
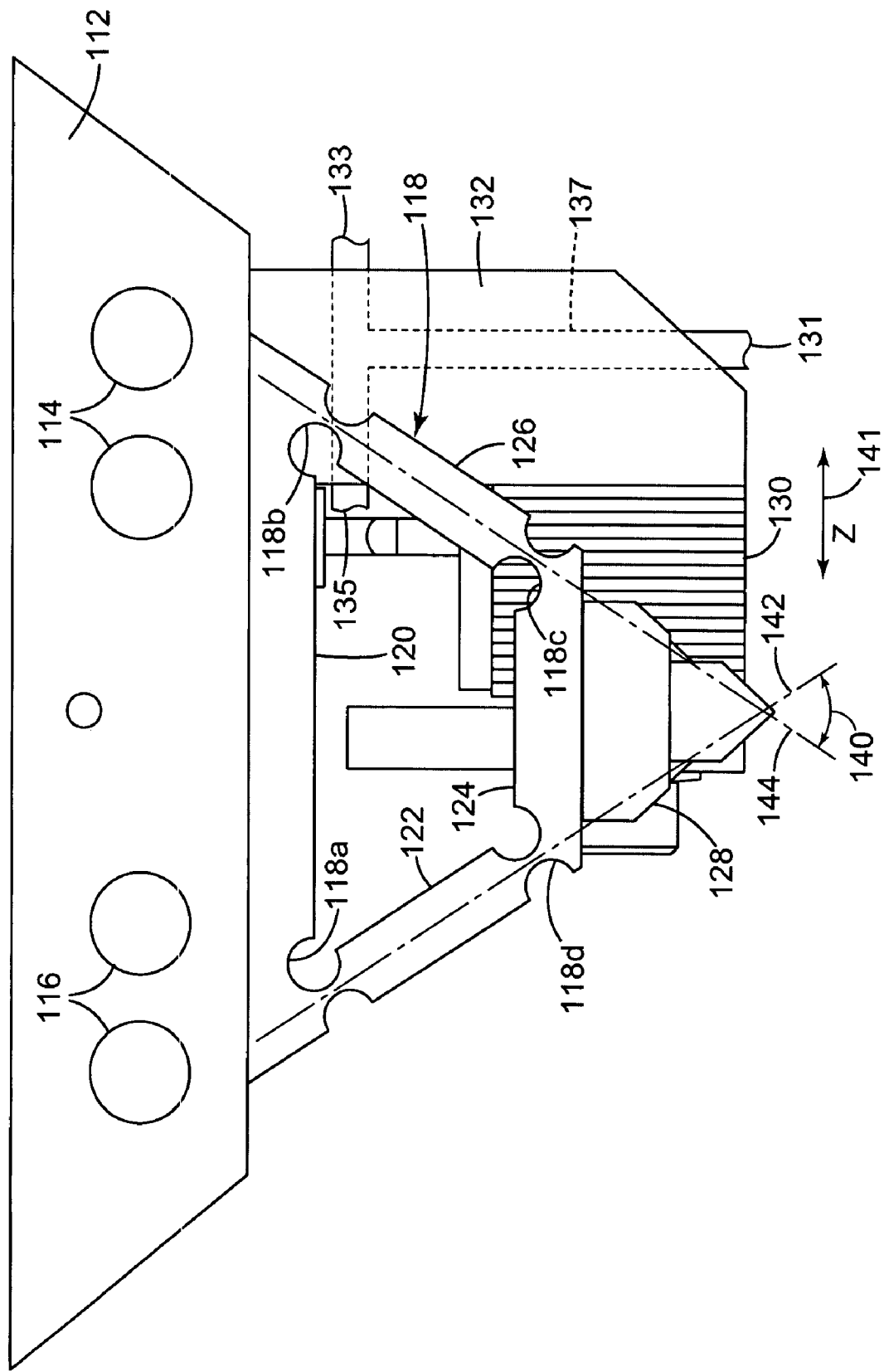
FIG. 6B is a top view of a virtual center Y actuator.
Figure 6C:
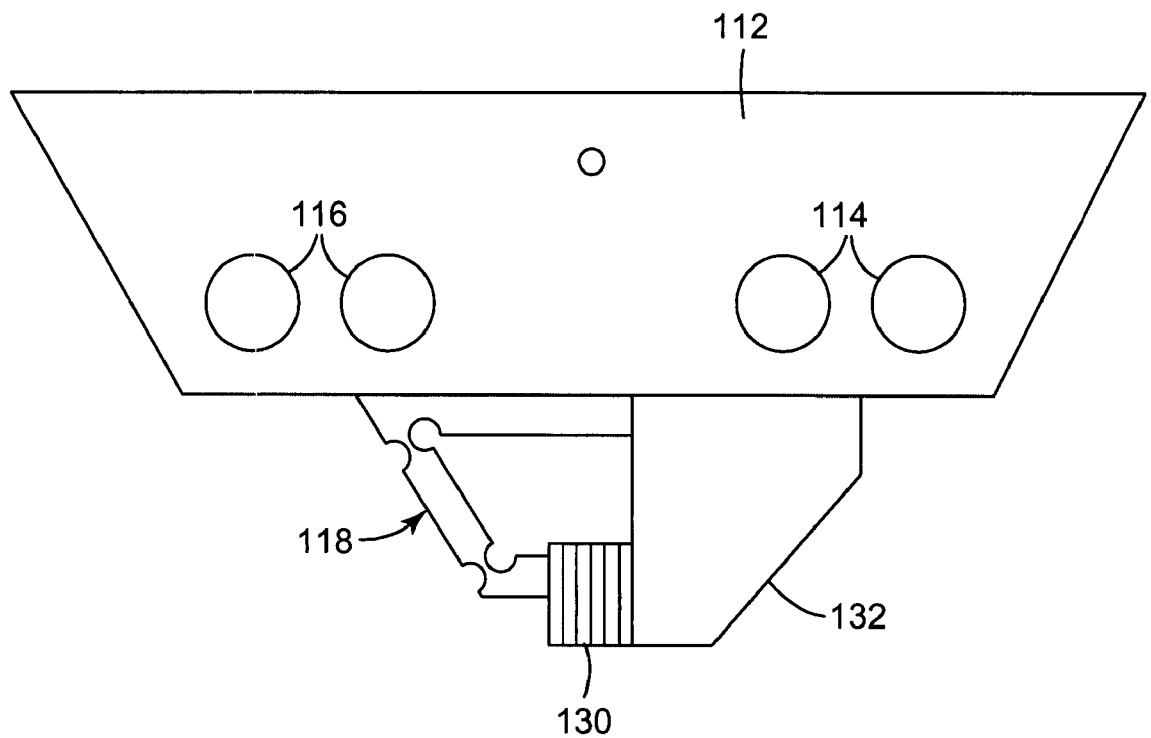
FIG. 6C is a bottom view of a virtual center Y actuator.
Figure 6D:
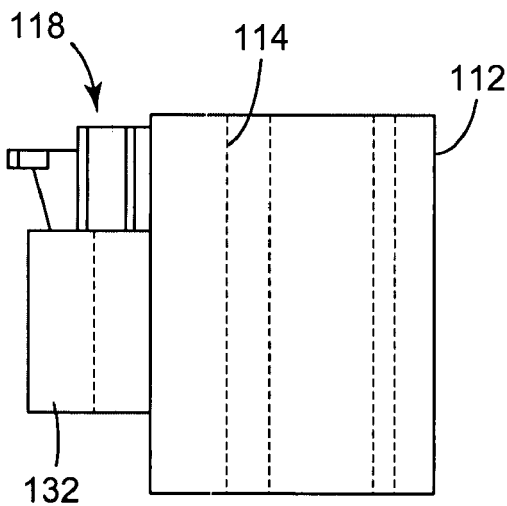
FIGS. 6D and 6E are side views of a virtual center Y actuator.
Figure 6E:
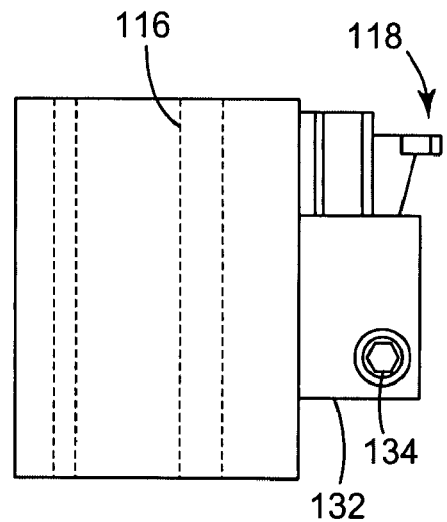
Figure 6F:
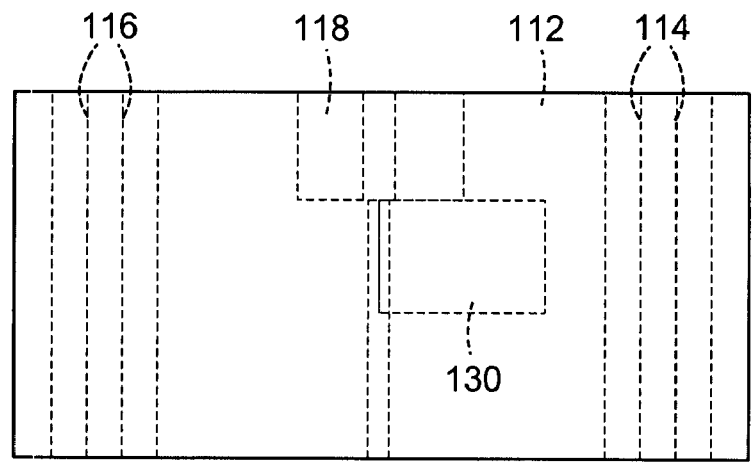
FIG. 6F is a back view of a virtual center Y actuator.
Figure 6G:
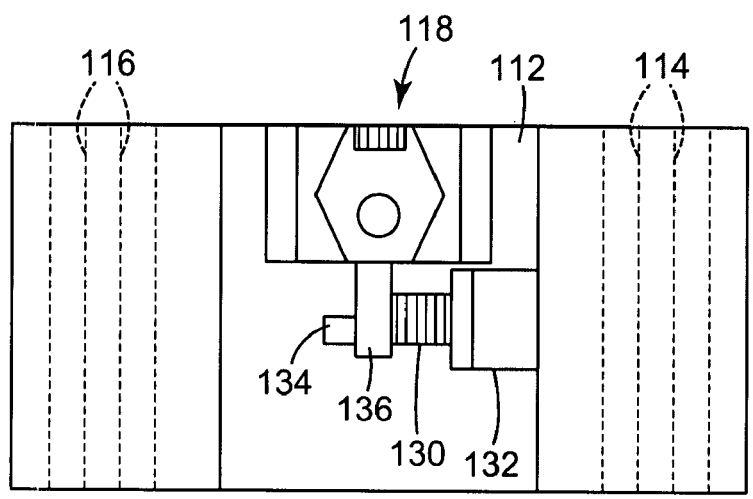
FIG. 6G is a front view of a virtual center Y actuator.

FIGS. 6A-6G are views of an exemplary virtual center Y actuator 110. The term "virtual center Y actuator" refers to any type of actuator or other device that provides for control of a rotation of the tool tip about an axis substantially parallel to a y-direction for use in machining a work piece. FIG. 6A is a perspective view of virtual center Y actuator 110. FIG. 6B is a top view of virtual center Y actuator 110. FIG. 6C is a bottom view of virtual center Y actuator 110. FIGS. 6D and 6E are side views of virtual center Y actuator 110. FIG. 6F is a back view of virtual center Y actuator 110. FIG. 6G is a front view of virtual center Y actuator 110. Some details of virtual center Y actuator 110 in FIGS. 6C-6G have been removed for clarity.

As shown in FIGS. 6A-6G, virtual center Y actuator 110 includes a main body 112 having a mounting block 132. A PZT stack 130 is secured between mounting block 132 and a plate 136 via a fastener 134. Plate 136 is attached to the bottom of a tool tip carrier 128 having a tool tip attached to it such that the tool tip is mounted transversely to PZT stack 130. Plate 136 can be implemented with one or more Belleville washers, for example, for use in preloading PZT stack 130. PZT stack 130 can be implemented with the exemplary PZT stack 72 shown in FIG. 3. The tool tip on a carrier 128 can be implemented with the tool tip carrier shown in FIGS. 4A-4D and the tool tip shown in FIGS. 5A-5D.

The tool tip carrier 128 is secured to a flexible unit 118 composed of four sides 120, 122, 124 and 126. Side 124 holds tool tip carrier 128, which can be secured to it using a fastener or adhesive, for example. Side 120 is secured to main body 112. Main body 112 also includes two pairs of apertures 114 and 116 for use in mounting it to tool post 36, such as via bolts, for machining work piece 54 under control of computer 12. An electrical connection 138 provides for transmitting signals to PZT stack 130 for control of it.

FIG. 6B is a top view of virtual center Y actuator 110 illustrating movement of the tool tip 128. Flexible unit 118 includes flex points 118a, 118b, 118c, and 118d. As PZT stack 130 moves in the z-direction, as illustrated by arrows 141, the flex points cause sides 122 and 126 to move back and forth, which in turn via side 124 causes rotation of the tool tip, as represented by arrows 140. Depending upon the movement of the PZT stack under control of computer 12, the virtual center Y actuator is capable of many different types of motions about a virtual axis.

As shown in FIG. 6B, main body 112 at block 132, for example, can be temperature controlled by transmitting a cooling fluid, as described above, into at least one of ports 131, 133, and 135, through aperture 137, and out at least one of ports 131, 133, and 135 (not used as an input port). Aperture 137 for transmitting the cooling fluid through main body 112 can include any particular shape or configuration, and any number of input and output ports may also be used.

Figure 7:
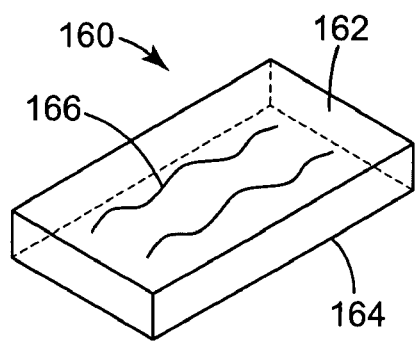
FIG. 7 is a diagram conceptually illustrating microstructures that can be made using the cutting tool system having a virtual center Y actuator.

FIG. 7 is a diagram conceptually illustrating microstructures that can be made using the cutting tool system having a virtual center Y actuator. As shown in FIG. 7, an article 160 includes a top surface 162 and a bottom surface 164. Top surface 162 includes microstructures as represented by lines 166, and those microstructures can be made using the actuators described above to machine a work piece and then using that work piece to make a film or article using a coating technique.

While the present invention has been described in connection with an exemplary embodiment, it will be understood that many modifications will be readily apparent to those skilled in the art, and this application is intended to cover any adaptations or variations thereof. For example, various types of materials for the tool post, actuator, and tool tip, and configurations of those components, may be used without departing from the scope of the invention. This invention should be limited only by the claims and equivalents thereof.

The invention claimed is:

1. A method for using a virtual center Y actuator to machine a work piece, comprising:
   providing a work piece having a surface to be machined;
   providing a virtual center Y actuator, the actuator comprising:
      a main body having a back side, a front side, and a mounting block on the front side;
      a flexible unit on the front side of the main body, wherein the flexible unit has a plurality of sides connected via flex points;
      a piezoelectric stack secured and preloaded on the mounting block, and attached to the flexible unit, such that the piezoelectric stack extends substantially parallel to the front side of the main body;
      a tool tip carrier attached to the flexible unit and having a surface for mounting a tool tip; and
      a tool tip mounted on the surface of the tool tip carrier, wherein the piezoelectric stack moves the flexible unit via the flex points in order to cause a rotation of the tool tip carrier about a y-direction axis substantially parallel to the surface of the work piece to be machined; and
   using the actuator to create structures in the surface of the work piece to be machined, wherein the structures are created by the tool tip as controlled by the actuator.

2. The method of claim 1, further including a plate attached between the piezoelectric stack and the tool tip carrier for the preloading of the piezoelectric stack.

3. The method of claim 1, wherein the tool tip carrier includes a portion having an aperture for mounting the tool tip carrier to the flexible unit.

4. The method of claim 1, wherein the tool tip carrier has a planar back surface mounted to the flexible unit.

5. The method of claim 4, wherein the tool tip carrier has a tapered front surface opposite the planar back surface.

6. The method of claim 1, wherein the piezoelectric stack is comprised of one of the following materials: barium titanate; lead zirconate; lead titanate; or a magnetostrictive material.

7. The method of claim 1, wherein the main body includes an aperture having a port for receiving a cooling fluid.

8. The method of claim 2, wherein the plate comprises a Belleville washer.

9. The method of claim 1, wherein the main body is comprised of stainless steel.

10. The method of claim 1, wherein the main body is configured to be removably attached to a tool post.

11. The method of claim 1, wherein the work piece is comprised of one of the following materials: copper; aluminum; nickel; steel; or plastic.

* * * * *